Oct. 25, 1932.   J. DE LA CIERVA   1,884,599
AIRCRAFT HAVING ROTATIVE WINGS
Filed Feb. 5, 1931   3 Sheets-Sheet 1

INVENTOR.
Juan de la Cierva
BY
Synnestvedt & Lechner
ATTORNEYS.

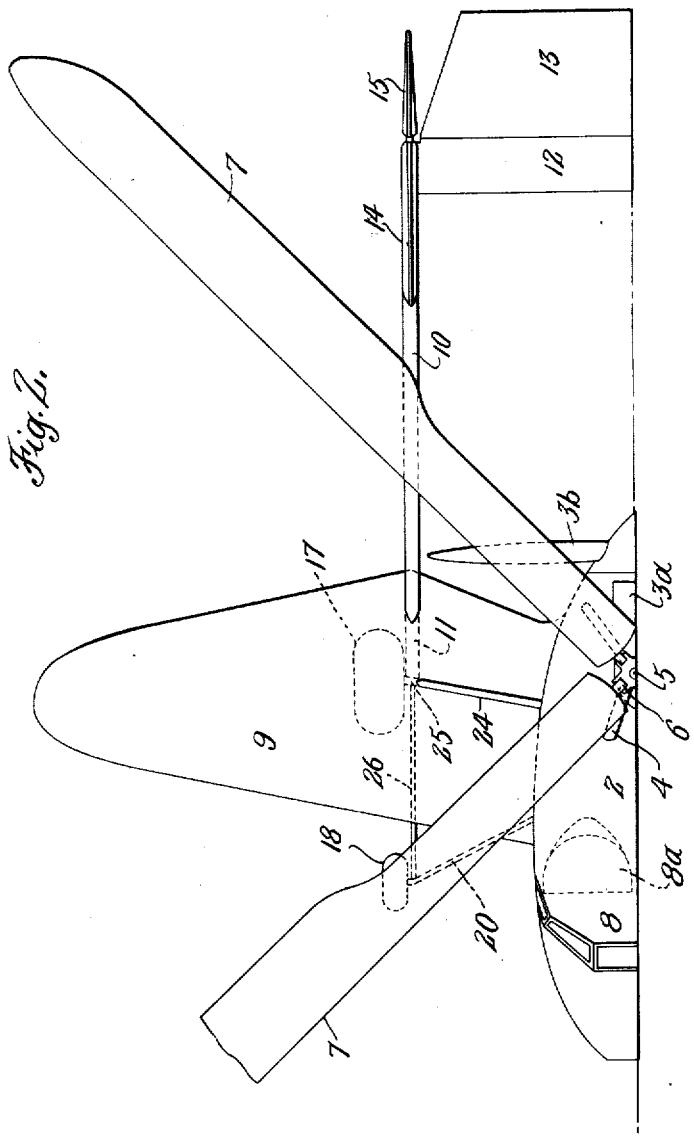

Oct. 25, 1932.  J. DE LA CIERVA  1,884,599
AIRCRAFT HAVING ROTATIVE WINGS
Filed Feb. 5, 1931  3 Sheets-Sheet 3
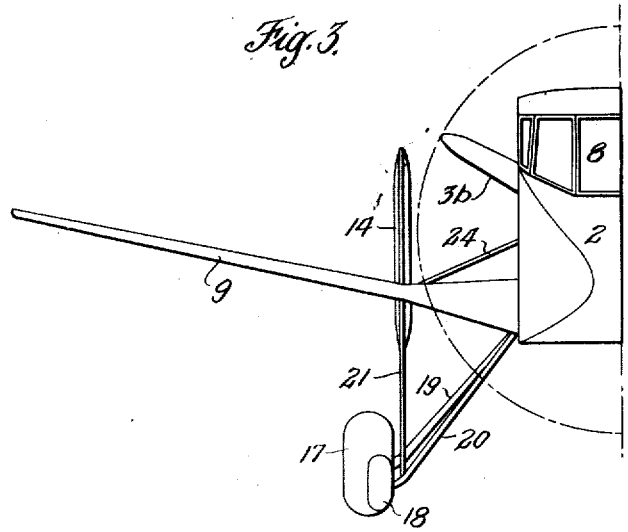
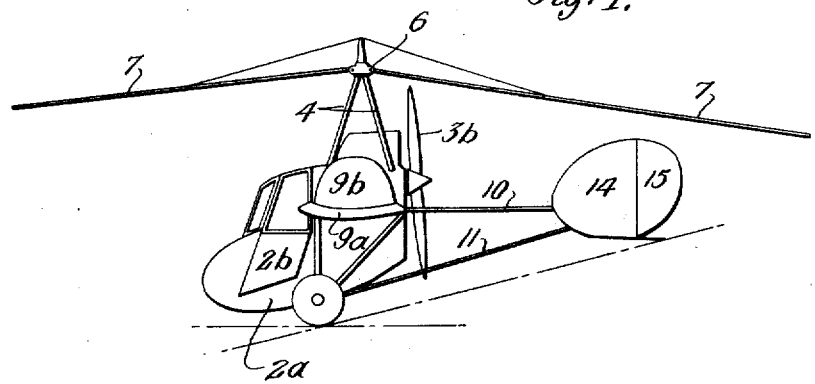
INVENTOR.
Juan de la Cierva
BY
Synnestvedt & Lechner
ATTORNEYS.

Patented Oct. 25, 1932

1,884,599

UNITED STATES PATENT OFFICE

JUAN DE LA CIERVA, OF MADRID, SPAIN, ASSIGNOR TO AUTOGIRO COMPANY OF AMERICA, OF PHILADELPHIA, PENNSYLVANIA, A CORPORATION OF DELAWARE

AIRCRAFT HAVING ROTATIVE WINGS

Application filed February 5, 1931. Serial No. 513,713.

The present invention relates to aircraft having rotative wings, and particularly to craft having such wings or supporting surfaces, arranged or adapted to be driven by relative air flow, such as is due to the translational movement of the aircraft in flight. The invention will be most clearly understood if the following premises be considered:

In all aircraft it is desirable to provide the pilot with the best possible view forward and downward, more especially when coming in to land, and landing. The attainment of this object assumes peculiar importance in the case of aircraft of the freely rotative wing type, however, owing to the large variations in longitudinal attitude of which they are capable. Aircraft having freely rotative wings or supporting surfaces are capable of stable and controlled flight over a very wide range of angles of incidence—controlled flight being possible at a low forward speed and at a positive angle of incidence much greater than with an aeroplane of the ordinary fixed wing type. They are also capable of substantially vertical descent on an even keel.

In aircraft of the rotating wing type, as hitherto constructed, the pilot has been seated behind a considerable part of the structure of the aircraft in such a position that his forward view has been limited to a few degrees below the horizontal with the aircraft on an even keel.

A primary object of the present invention is to construct an aircraft of the type hereinbefore referred to, in which the pilot is provided with a less obstructed view forward and downward than hitherto, preferably a clear view extending to about 45 degrees below the horizontal (with the aircraft on an even keel).

A further object of the invention is to obtain the full benefit of air-draughts or slip-steam from the air-screws or other propelling means, so as to utilize to the full and in an improved manner, such air currents in initially starting the air-driven rotative wings before take-off, and preferably to accomplish this by placing non-rotative adjustable tail surfaces rearwardly of such propelling means, in a relation not heretofore attainable.

The invention further contemplates the minimization of the objectionable effects, on the crew and passengers, of the noises generated by the propelling means.

More particularly, the invention contemplates a novel co-operative relation between certain of the fundamental elements of an aircraft of the freely-rotative-wing type; such type (as first disclosed in my Patent No. 1,590,497 of June 29th, 1926) involving a freely rotatable central hub or axis member on which are mounted a plurality of blades or wings individually articulated in such manner as to be rotated and pivotally oscillated by the relative air-flow. According to the present invention, I provide an aircraft of this nature with a body structure in which a place for the pilot is provided in the fore part thereof, and propelling means such, for instance, as an engine and pusher airscrew are mounted in, on or adjacent the rear part of such body.

A specific embodiment of the present invention contemplates the mounting of stabilizing and directing means to the rear of the propelling means and preferably carried by means of booms or outriggers forming no part of the body structure proper, said booms or outriggers advantageously being disposed parallel to the flight direction, when viewed in plan, in such positions as to be outside the slip-stream from the propelling means.

According to a preferred arrangement the said tail members or organs comprise paired vertical surfaces so laterally spaced as to lie entirely outside the slip-stream from the propelling means, and one or more normally horizontal surfaces situated between the said vertical surfaces. All or part of the vertical surfaces may be made movable as rudders and all or part of the horizontal surfaces may be made movable as elevators. As before indicated, I so arrange the various parts that one or more of the horizontal surfaces may be adapted to serve as a "deflector" for the slipstream or rearward air-draught from the said rearwardly-disposed propelling means. Such a deflector surface may conveniently be mounted at a distance from the axis of the rotative wings equal to about two thirds of the "tip-radius", or length from the axis of the rotative wings, and in such a manner that the forward edge of such surface, or of the lowest if more than one are employed, lies close to the ground when such surface is in the deflecting position.

An aircraft constructed in accordance with the present invention may further embody small fixed wings or supporting surfaces extending on either side laterally of the body structure and disposed so that their mean centers of pressure (that is, the points at which the mean air reaction on such fixed wings takes effect) lie somewhat forwardly of the center of gravity of the whole aircraft. Such fixed wings may conveniently carry controllable flaps or ailerons for lateral balancing and control or other purposes, and may also be set with an upward "dihedral" angle for promoting lateral stability.

Owing to the shape of the body structure and the location of the pilot's seat in the nose or forward part thereof the pilot may have an uninterrupted forward and downward view extending more than 45 degrees below the horizontal, and since pilot and passengers are located forwardly of the propelling means, they will be less troubled by the noise of the latter.

Owing to the fact that the horizontal deflector surface or surfaces extends or extend completely across the slip-stream or streams and overlap the latter at its or their extremities and that the forward edge of said horizontal deflector surface (or of the lowest of them where there are more than one) lies close to the ground along its whole width (when in the deflecting position) substantially the whole of said slip-stream or streams is capable of being deflected upwards towards the rotor for starting purposes.

The placing of the rudders outside of the slip-stream or streams tends to assimilate the degree and "feel" of directional control when the propelling means are working to that when the propelling means are shut off. and this feature, together with the placing of the booms or outriggers carrying rudders and fins outside of the slip-stream or streams, contributes towards the reduction of head resistance or drag.

Further features of the present invention will appear in the following description of a particular constructional form of the invention with reference to the accompanying drawings, of which:

Figure 2 is a half-plan view of the same;

Figure 3 is a half view, in front elevation, of the same machine with parts omitted for the sake of clarity; and Figure 4 is a view, in side elevation, of a modified form of construction embodying the invention.

Figure 1:
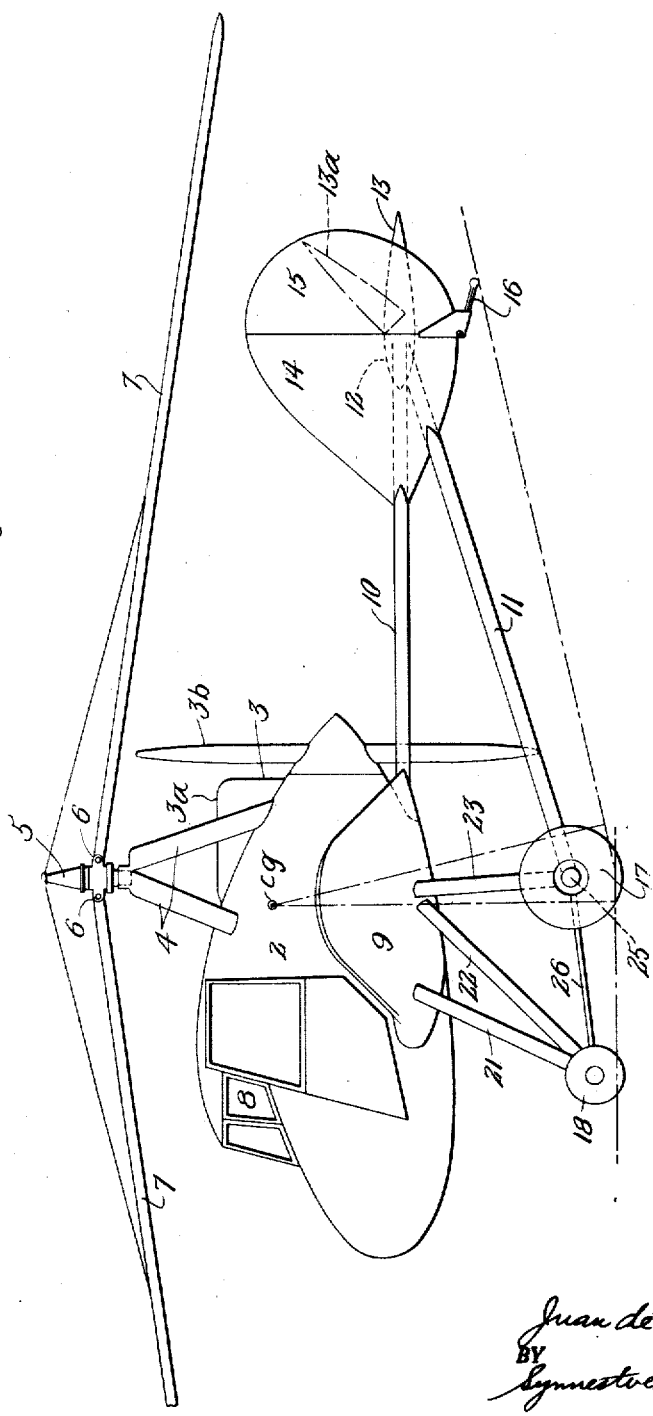
Figure 1 is a side elevational view of an aircraft embodying the present invention.

Referring first to Figs. 1, 2 and 3 it will be seen that I have shown an aircraft comprising a body 2, an engine housed at 3 partly in the body and partly in an auxiliary housing or cowl 3a, and an airscrew or propeller 3b. A pyramid of struts 4, rigidly mounted on the body 2, carries a hub 5 freely rotatable about a substantially vertical axis, to which hub are articulated at 6 four freely-rotative wings 7, two only being shown in Fig. 1. In the fore part of the body 2 is situated a pilot's cabin 8 containing seats located side by side for a pilot and one passenger, (as at 8a in Fig. 2), while the engine 3 and airscrew 3b are located at the extreme rear of the body 2.

The aircraft further comprises a pair of small fixed wings 9 attached to the sides of the body 2. Extending aft from the fixed wings 9 are a pair of booms 10 which are braced in the vertical plane by members 11, which may be termed "bottom booms". The outrigger trusses so formed carry the tail organs or members comprising a horizontal fixed plane 12, hinged elevator 13, paired vertical fins 14, rudders 15, and tailskids 16. The more basic relationships of the fixed and rotary wings herein shown are disclosed and claimed in my co-pending application, Serial No. 414,901, filed December 18, 1929.

The elevator 13 may be pulled up through a large angle as at 13a, to deflect the slipstream from the airscrew 3b against the rotative wings 7 and this object is assisted by locating the tail plane and elevator 12, 13 at a distance from the (produced) axis of the rotative hub 5 equal to about two thirds of the "tip-radius" or maximum length from the axis of the rotative wings 7. The small ground clearance of the leading edge of the tail plane 12 and the end shielding effect of the fins and rudders 14, 15 on the deflecting surface 13, together with the proximity of the propeller and the tail structure, also assist in efficiently trapping and deflecting the slipstream by checking its tendency to spread sideways. It should be noticed that when the slip-stream is not being deflected the fins 14 and rudders 15 are entirely outside the slipstream, thus assimilating the directional control characteristics in the "engine-on" and "engine-off" conditions.

The aircraft comprises also an undercarriage having two main wheels 17 and two auxiliary forward wheels 18. The main wheels are so located with respect to the center of gravity $cg$, of the aircraft (see Fig. 1) that when all four wheels are on the ground the center of gravity is forward of the axis of the main wheels 17, and when the main wheels and tail skids 16 are on the ground, the forward wheels 18, being clear of the ground, the center of gravity lies in rear of the main wheels 17, thus giving two stable positions of rest on the ground.

The main wheels 17 may conveniently be carried on unsprung bent axles 19 and the auxiliary wheels 18 on similar axles 20. The axles 20 are braced to the wing 9 by struts 21, 22 and the main landing loads on the main wheels 17 are taken by a rigid strut 23 to the fixed wing 9, the points of attachment of struts 23 to the wings 9 being braced to the body 2 by upper struts 24. The point of attachment of the struts 21, 22 to the axle 20 is connected to the junction point 25 by a member 26.

On each side of the aircraft the strut 23, the bottom boom 11 and the axle 19 are brought to a common junction point 25, close to the center of the wheel 17, and there rigidly fixed to one another to form a good stout construction. Furthermore, in flight, the elements 21, 22, 23, 26, 10, 11, 14 and 15, are substantially in line, as far as wind resistance is concerned; the same being also true of members 19 and 20, with the craft at cruising altitude.

In addition, the outrigger trusses thus consist of simple rigid triangles formed of the members 10, 11 and 23.

Referring now to Fig. 4, the modified form of construction there shown differs from the form of Figs. 1, 2 and 3 in that the body 2a is set with a low ground clearance and the door 2b extending down to adjacent the bottom of the body, admits of easy entrance and egress for the pilot and passenger.

In this case no forward wheels are provided since the body is low enough in front to prevent overturning on the ground.

In order to counteract the unstabilizing effect of the large extent of keel surface of the body situated below the center of gravity of the aircraft, the fixed wings 9a are, in this construction, provided with upturned tips 9b which are set at an angle of about 45 degrees to the horizontal in front elevation. Other details of this construction are evident in Fig. 4.

In addition to the advantages hereinbefore pointed out, it will now be obvious that there are substantial advantages in the location of the motor or engine adjacent the base of the pyramid, or between the pylon legs; as well as in the unusually proximate disposition of $cg$, rotor, fixed wings, cabin, propelling means and undercarriage, all of which results in a great degree of inherent stability under all conditions of operation.

What I claim is:—

1. In an aircraft, the combination of a system of rotative blades adapted to be driven by the relative flight wind, and a body structure having propelling means mounted toward the rear thereof and a place for the occupant toward the front thereof, and a stabilizing element in the rear of the propelling means.

2. In an aircraft, the combination of a system of rotative blades adapted to be driven by the relative flight wind, and a body structure having propelling means mounted toward the rear thereof and a place for the occupant toward the front thereof, and a control element in the rear of the propelling means.

3. In an aircraft, the combination of a system of rotative blades adapted to be driven by the relative flight wind, and a body structure having propelling means mounted toward the rear thereof and a place for the occupant toward the front thereof, tail elements in the rear of the propelling means, and outrigger construction carrying said elements.

4. In an aircraft, the combination of a system of rotative blades adapted to be driven by the relative flight wind, and a body structure having propelling means mounted toward the rear thereof and a place for the occupant toward the front thereof, tail elements in the rear of the propelling means, and outrigger construction carrying said elements and lying outside of the slip-stream of the propelling means.

5. In an aircraft, the combination of a system of rotative blades adapted to be driven by the relative flight wind, and a body structure having propelling means mounted toward the rear thereof and a place for the occupant toward the front thereof, tail elements in the rear of the propelling means, and outrigger construction carrying said elements, said tail elements including laterally spaced apart substantially vertical tail surfaces.

6. In an aircraft, the combination of a system of rotative blades adapted to be driven by the relative flight wind, and a body structure having propelling means mounted toward the rear thereof and a place for the occupant toward the front thereof, tail elements in the rear of the propelling means, and outrigger construction carrying said elements, said tail elements including laterally spaced apart substantially vertical tail surfaces lying outside the slip-stream.

7. In an aircraft, the combination of a system of rotative blades adapted to be driven by the relative flight wind, and a body structure having propelling means mounted toward the rear thereof and a place for the occupant toward the front thereof, tail elements in the rear of the propelling means, and outrigger construction carrying said elements, said tail elements including one or more substantially horizontal surfaces, at least in part movable as elevator means.

8. In an aircraft, the combination of a system of rotative blades adapted to be driven by the relative flight wind, and a body structure having propelling means mounted toward the front thereof, tail elements in the rear of the propelling means, and outrigger construction carrying said elements, said tail elements including one or more substantially horizontal surfaces, at least in part movable as slip-stream deflector means.

9. In an aircraft, the combination of a system of rotative blades adapted to be driven by the relative flight wind, and a body structure having propelling means mounted toward the rear thereof and a place for the occupant toward the front thereof, tail elements in the rear of the propelling means, and outrigger construction carrying said elements, said tail elements including laterally spaced apart substantially vertical tail surfaces lying outside the slip-stream and one or more substantially horizontal surfaces, the latter being at least in part movable as elevator means and the former as rudder means.

10. In an aircraft, the combination of a system of rotative blades adapted to be driven by the relative flight wind, and a body structure having propelling means mounted toward the rear thereof and a place for the occupant toward the front thereof, tail elements in the rear of the propelling means, and outrigger construction carrying said elements, said tail elements including laterally spaced apart substantially vertical tail surfaces lying outside the slip-stream and one or more substantially horizontal surfaces, the latter being at least in part movable as slip-stream starter means and the former as rudder means.

11. In an aircraft, the combination of a system of rotative blades adapted to be driven by the relative flight wind, and a body structure having propelling means mounted toward the rear thereof and a place for the occupant toward the front thereof, tail elements in the rear of the propelling means, and outrigger construction carrying said elements, together with landing gear mechanism to which the outrigger construction is braced.

12. A construction according to claim 3, in which the outrigger construction comprises one or more simple triangles of substantially rigid elements.

13. A construction according to claim 11, in which the outrigger construction comprises one or more simple triangles of substantially rigid elements, having one vertex at a fixed point of the landing gear mechanism.

14. A construction according to claim 3 in which there are undercarriage struts, wheel means and axle means, said axle means, outrigger construction and at least one of said struts being interconnected.

15. A construction according to claim 3 in which there are undercarriage struts, wheel means and axle means, said axle means, outrigger construction and at least one of said struts being interconnected at a point adjacent the wheel means.

16. In an aircraft, the combination of a system of rotative blades adapted to be driven by the relative flight wind, and a body structure having propelling means mounted toward the rear thereof and a place for the occupant toward the front thereof, tail elements in the rear of the propelling means, and outrigger construction carrying said elements, together with relatively fixed wings at each side of the body, at least in part forward of the propelling means.

17. In an aircraft, the combination of a system of rotative blades adapted to be driven by the relative flight wind, and a body structure having propelling means mounted toward the rear thereof and a place for the occupant toward the front thereof, tail elements in the rear of the propelling means, and outrigger construction carrying said elements, together with relatively fixed wings at each side of the body, and connected with the outrigger construction.

18. In an aircraft, the combination of a system of rotative blades adapted to be driven by the relative flight wind, and a body structure having propelling means mounted toward the rear thereof and a place for the occupant toward the front thereof, tail elements in the rear of the propelling means, and outrigger construction carrying said elements, together with relatively fixed wings at each side of the body, and connected with the outrigger construction, said fixed wings being thickened in that portion which lies between the body and the point of connection with the outrigger construction.

19. In an aircraft the combination of a system of rotative blades adapted to be driven by the relative flight wing, and a body structure having propelling means mounted toward the rear thereof, and a place for the occupant toward the front thereof, the forward part of the body being arranged with relatively small ground clearance so as to facilitate ingress and egress of occupants and loading and unloading of cargo.

20. In an aircraft having a sustaining rotor adapted to be driven by relative airflow, a body therebeneath, and a forward-propelling prime mover mounted substantially beneath the axis of the rotor and housed at least in part within said body, and a pyramid, for mounting the rotor on the body, having legs extending downwardly adjacent said prime mover.

21. In an aircraft, the combination of a system of rotative blades adapted to be driven by the relative flight wind, and a body structure having propelling means mounted toward the rear thereof, with surfaces mounted behind the propelling means and at a distance from the axis (extended) of the rotative system approximately two-thirds the radius of said system.

22. In an aircraft, the combination of a system of rotative blades adapted to be driven by the relative flight wind, and a body structure having propelling means mounted toward the rear thereof, with surfaces mounted behind the propelling means, at least part of said surfaces being adapted to deflect slip-stream of the propelling means through the path of travel of the rotative blades.

23. In an aircraft of the character described, a body, a rotative sustaining blade system thereabove adapted to be actuated by relative air-flow, and a propeller rearward of the nose of said body, and a deflectable surface mounted rearward of the propeller and with small ground clearance.

24. In an aircraft, the combination of a system of rotative blades adapted to be driven by the relative flight wind, a body structure having propelling means mounted toward the rear thereof and a place for the occupant toward the front thereof, main landing means substantially adjacent the center of gravity, and means forward thereof arranged to prevent nosing over.

25. In an aircraft, the combination of a system of rotative blades adapted to be driven by the relative flight wind, a body structure having propelling means mounted toward the rear thereof and a place for the occupant toward the front thereof, main landing means substantially adjacent the center of gravity, and means forward thereof arranged to prevent nosing over, together with landing means rearward of the main landing means.

26. In an aircraft, the combination of a system of rotative blades adapted to be driven by the relative flight wind, a body structure having propelling means mounted toward the rear thereof and a place for the occupant toward the front thereof, main landing means substantially adjacent the center of gravity, and means forward thereof arranged to prevent nosing over, together with landing means rearward of the main landing means, all of the last three means being so arranged with respect to clearances and the center of gravity that the aircraft may alternatively rest in equilibrium on the ground on either the first two or the last two of said three means.

27. An aircraft including a body structure, a rotor system of normally freely rotative sustaining blades or wings mounted above the body of the craft, said system including a head or hub structure and pivot means for the attachment of the several blades thereto for upward and downward swinging movement, and forward propelling means for the craft including an engine mounted below the general path of travel of the blades and disposed relatively close to the lift line of the rotor and a propeller, arranged in pusher fashion, connected with said engine rearwardly of at least a major portion of the body structure and also disposed below the path of travel of said blades relatively close to the axis thereof, whereby, even when the blades swing downwardly on their pivots, a substantial amount of clearance is provided between the propeller disc and the general path of travel of the rotor blades.

28. An aircraft including a body structure, a rotor system of blades or wings pivotally mounted for upward and downward swinging movement above the body of the craft, an occupant's compartment located in a forward portion of said body structure, and forward propelling means, arranged in pusher fashion, located toward the rear of the body structure, said forward propelling means including an engine, and a propeller arranged below the general path of travel of the rotor blades rearwardly of at least a major portion of the body structure, and the occupants compartment, rotor, engine and propeller all being relatively compactly arranged fore and aft of the craft with the occupant's compartment disposed just forwardly of the rotor axis and the propeller located just rearwardly of said axis, whereby to maintain the major portion of the weight of the craft relatively close to the center of lift of the rotor and at the same time provide ample clearance between the propeller disc and the general path of travel of the rotor blades, even when the latter swing or pivot downwardly.

29. An aircraft including a body structure, a rotor system mounted thereabove for normally free rotation under the influence of relative flight wind, forward propelling means for the craft including an engine disposed toward the rear of said body structure and a propeller disposed rearwardly of the engine and rearwardly of the axis of the rotor, and an occupant's compartment arranged in said body structure forwardly of the rotor axis, the occupant's compartment being equipped with side by side seating arrangements for a plurality of occupants, whereby to provide for disposition of the major portion of the weight of the craft, in flight, relatively closely adjacent to the rotor axis and thus relatively close to the line of lift of the rotor.

30. An aircraft including a body structure, a system of rotative blades mounted above the body and adapted to be driven by the relative flight wind, propelling means including an engine located below the rotor and closely adjacent to the axis thereof and a propeller arranged rearwardly of the body and below the general path of travel of the rotor blades, and a stabilizing surface arranged rearwardly of the propeller and within the influence of its slip-stream, whereby to provide for location of the engine closely adjacent to the line of lift of the rotor and, at the same time, to provide for maximum utilization of the stabilizing effect of the slip-stream on said surface.

31. An aircraft including a body structure, a rotor system of normally freely rotative sustaining blades or wings mounted above the body of the craft, said system including a head or hub structure and pivot means for the attachment of the several blades thereto for upward and downward swinging movement, and forward propelling means for the craft including an engine mounted below the general path of travel of the blades and disposed substantially in the line of lift of the rotor, and a propeller connected with said engine and arranged below the path of travel of said blades relatively close to the axis thereof, whereby, even when the blades swing downwardly on their pivots, a substantial amount of clearance is provided between the propeller disc and the general path of travel of the rotor blades.

In testimony whereof I have hereunto signed my name.

JUAN DE LA CIERVA.

CERTIFICATE OF CORRECTION.

Patent No. 1,884,599.                  October 25, 1932.

JUAN DE LA CIERVA.

It is hereby certified that error appears in the printed specification of the above numbered patent requiring correction as follows: Page 3, line 32, for "altitude" read "attitude"; and that the said Letters Patent should be read with this correction therein that the same may conform to the record of the case in the Patent Office.

Signed and sealed this 27th day of December, A. D. 1932.

M. J. Moore,
Acting Commissioner of Patents.

(Seal)

and below the general path of travel of the rotor blades, and a stabilizing surface arranged rearwardly of the propeller and within the influence of its slip-stream, whereby to provide for location of the engine closely adjacent to the line of lift of the rotor and, at the same time, to provide for maximum utilization of the stabilizing effect of the slip-stream on said surface.

31. An aircraft including a body structure, a rotor system of normally freely rotative sustaining blades or wings mounted above the body of the craft, said system including a head or hub structure and pivot means for the attachment of the several blades thereto for upward and downward swinging movement, and forward propelling means for the craft including an engine mounted below the general path of travel of the blades and disposed substantially in the line of lift of the rotor, and a propeller connected with said engine and arranged below the path of travel of said blades relatively close to the axis thereof, whereby, even when the blades swing downwardly on their pivots, a substantial amount of clearance is provided between the propeller disc and the general path of travel of the rotor blades.

In testimony whereof I have hereunto signed my name.

JUAN DE LA CIERVA.

CERTIFICATE OF CORRECTION.

Patent No. 1,884,599.     October 25, 1932.

JUAN DE LA CIERVA.

It is hereby certified that error appears in the printed specification of the above numbered patent requiring correction as follows: Page 3, line 32, for "altitude" read "attitude"; and that the said Letters Patent should be read with this correction therein that the same may conform to the record of the case in the Patent Office.

Signed and sealed this 27th day of December, A. D. 1932.

(Seal)

M. J. Moore,
Acting Commissioner of Patents.

CERTIFICATE OF CORRECTION.

Patent No. 1,884,599.   October 25, 1932.

JUAN DE LA CIERVA.

It is hereby certified that error appears in the printed specification of the above numbered patent requiring correction as follows: Page 3, line 32, for "altitude" read "attitude"; and that the said Letters Patent should be read with this correction therein that the same may conform to the record of the case in the Patent Office.

Signed and sealed this 27th day of December, A. D. 1932.

(Seal)

M. J. Moore,
Acting Commissioner of Patents.